United States Patent
Zhao (10) Patent No.: US 12,333,192 B2
(45) Date of Patent: Jun. 17, 2025

(54) MEMORY CONFIGURATION METHOD, APPARATUS, ELECTRONIC DEVICE, AND STORAGE MEDIUM

(71) Applicants: VERISILICON MICROELECTRONICS (CHENGDU) CO., LTD., Sichuan (CN); VERISILICON MICROELECTRONICS (SHANGHAI) CO., LTD., Shanghai (CN); VERISILICON MICROELECTRONICS (NANJING) CO., LTD., Jiangsu (CN); VERISILICON MICROELECTRONICS (BEIJING) CO., LTD., Beijing (CN)

(72) Inventor: Zheng Zhao, Shanghai (CN)

(73) Assignees: VERISILICON MICROELECTRONICS (CHENGDU) CO., LTD., Sichuan (CN); VERISILICON MICROELECTRONICS (SHANGHAI) CO., LTD., Shanghai (CN); VERISILICON MICROELECTRONICS (NANJING) CO., LTD., Jiangsu (CN); VERISILICON MICROELECTRONICS (BEIJING) CO., LTD., Beijing (CN)

( * ) Notice: Subject to any disclaimer, the term of this patent is extended or adjusted under 35 U.S.C. 154(b) by 40 days.

(21) Appl. No.: 18/361,050

(22) Filed: Jul. 28, 2023

(65) Prior Publication Data

US 2024/0036771 A1 Feb. 1, 2024

(30) Foreign Application Priority Data

Jul. 29, 2022 (CN) .......................... 202210910430.1

(51) Int. Cl.
*G06F 3/06* (2006.01)

(52) U.S. Cl.
CPC .......... *G06F 3/0665* (2013.01); *G06F 3/0604* (2013.01); *G06F 3/0631* (2013.01); *G06F 3/0679* (2013.01)

(58) Field of Classification Search
CPC .... G06F 3/0665; G06F 3/0604; G06F 3/0631; G06F 3/0679; G06F 3/0608;
(Continued)

(56) References Cited

U.S. PATENT DOCUMENTS

| 10,353,454 B2 * | 7/2019 | Shirota ................ G06F 3/0625 |
| 2009/0307462 A1 * | 12/2009 | Fleming ................ G06F 12/126 711/E12.059 |

(Continued)

*Primary Examiner* — Curtis James Kortman
(74) *Attorney, Agent, or Firm* — BCF LLP (57) ABSTRACT

Disclosed are a memory configuration method, apparatus, electronic device, and storage medium. The memory configuration method includes: obtaining virtual memory by dividing a solid-state storage hard disk; establishing communication paths between a hardware management unit and the solid-state storage hard disk, so that the virtual memory can be accessed through the hardware management unit, wherein the hardware management unit is configured to manage high-speed access protocol queues; measuring the memory access pressure of the hardware management unit; and adjusting the size of the virtual memory according to the memory access pressure.

12 Claims, 4 Drawing Sheets

(58) Field of Classification Search
CPC ...... G06F 3/0644; G06F 3/0659; G06F 3/061; G06F 3/0667; G06F 12/08; G06F 12/023; G06F 12/123

See application file for complete search history.

(56) References Cited

U.S. PATENT DOCUMENTS

| | | | |
|---|---|---|---|
| 2016/0253263 A1* | 9/2016 | Takada | G06F 12/0871 |
| | | | 711/119 |
| 2017/0083252 A1* | 3/2017 | Singh | G06F 9/5016 |
| 2020/0241794 A1* | 7/2020 | Yeo | G06F 12/1408 |
| 2022/0066928 A1* | 3/2022 | Tavallaei | G06F 12/123 |
| 2024/0012570 A1* | 1/2024 | Durazzo | G06N 10/60 |

\* cited by examiner

MEMORY CONFIGURATION METHOD, APPARATUS, ELECTRONIC DEVICE, AND STORAGE MEDIUM

CROSS-REFERENCE TO RELATED APPLICATION

The present disclosure claims the priority to Chinese patent application with the filing number 202210910430.1 filed on Jul. 29, 2022 with the Chinese Patent Office, the contents of which are incorporated herein by reference in entirety.

FIELD OF THE INVENTION

The present disclosure relates to the field of computer technology, and in particular, to a configuration method and apparatus for memory, an electronic device, and a storage medium.

BACKGROUND OF THE INVENTION

Memory of a computer system can be expanded through virtual memory. That is, a part of hard disk memory is used as system memory, so as to increase the memory that can be used by the computer.

Figure 1:
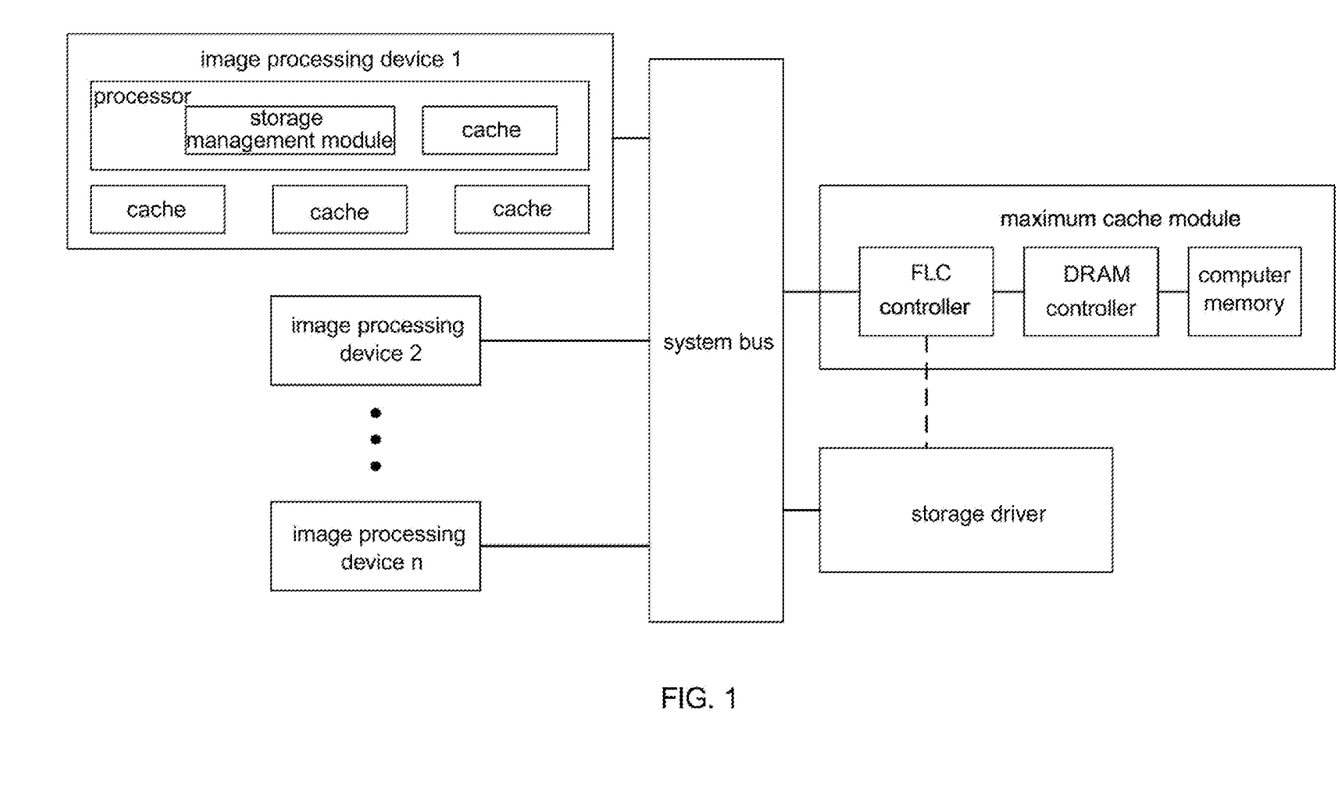
FIG. 1 is a schematic structural diagram of the computer system that adopts the FLC controller at present.

The current approach of using a part of hard disk memory as system memory is shown in FIG. 1. In the technical solution shown in FIG. 1, a computer system using a final level cache (FLC) controller is adopted. The computer system is mainly composed of n image processing devices, a system bus, a maximum cache module, and a storage driver. The maximum cache module, which replaces the traditional memory unit, can access the storage driver without the system bus. In this system, parts of the storage driver can function as the maximum cache module, so that a part of the hard disk memory is used as system memory to expand computer memory. Although this technical solution can expand system memory, the application program cannot access the virtual memory in the same way as it accesses the system memory.

SUMMARY

Embodiments of the present disclosure aim at providing a memory configuration method, apparatus, electronic device, and storage medium so as to realize non-differential access to system memory and virtual memory.

In the first aspect, an embodiment of the present disclosure provides a configuration method for memory, including: obtaining virtual memory by dividing a solid-state storage hard disk; establishing communication paths between a hardware management unit and the solid-state storage hard disk, so that the virtual memory is accessed through the hardware management unit, wherein the hardware management unit is configured to manage high-speed access protocol queues; measuring the memory access pressure of the hardware management unit; and adjusting the size of the virtual memory according to the memory access pressure.

In an embodiment of the present disclosure, virtual memory is first obtained by dividing the solid-state storage hard disk, and then a communication path between the hardware management unit and the solid-state storage hard disk is established. Since the hardware management unit is used to manage high-speed access protocol queues, users can quickly access the virtual memory via the hardware management unit. In addition, the memory access pressure of the hardware management unit is measured and the size of the virtual memory is adjusted accordingly to avoid crashing of the application program due to memory exhaustion. Thus, non-differential access to the system memory and the virtual memory is achieved.

As one possible implementation, the step of obtaining virtual memory by dividing a solid-state storage hard disk includes: dividing the solid-state storage hard disk to obtain a storage space that upper-layer applications are not allowed to access, wherein the storage space is determined as virtual memory.

In an embodiment of the present disclosure, by means of dividing a solid-state storage hard disk to obtain the storage space that upper-layer applications are not allowed to access and using the storage space as virtual memory, an effective virtual memory is obtained.

As one possible implementation, the step of establishing communication paths between the hardware management unit and the solid-state storage hard disk includes: sending a queue address of the hardware management unit to the driver of the solid-state storage hard disk, and controlling the driver to create a new input/output (IO) queue using the queue address of the hardware management unit, so that a path from the solid-state storage hard disk to the hardware management unit is established; obtaining attribute information of the solid-state storage hard disk, and configuring the hardware management unit based on the attribute information, so that I/O commands for the solid-state storage hard disk are generated in the queue of the hardware management unit, and a path from the hardware management unit to the solid-state storage hard disk is established.

In an embodiment of the present disclosure, the establishment of the communication paths between the hardware management unit and the solid-state storage hard disk is realized by respectively establishing a path from the solid-state storage hard disk to the hardware management unit, and a path from the hardware management unit to the solid-state storage hard disk.

As one possible implementation, the configuration method for the memory further includes: determining whether the number of I/O queues of the solid-state storage hard disk reaches the maximum, wherein if the number of I/O queues of the solid-state storage hard disk reaches the maximum, the driver is controlled to delete a pair of I/O queues from the I/O queues for the solid-state storage hard disk.

In an embodiment of the present disclosure, if the number of I/O queues of the solid-state storage hard disk reaches the maximum, a pair of I/O queues is deleted before a new I/O queue can be created, so as to ensure that the communication path between the solid-state storage hard disk and the hardware management unit can be established.

As one possible implementation, the configuration method for the memory further includes: configuring the access mode of the virtual memory according to the preset memory access mode.

In an embodiment of the present disclosure, the access mode to the virtual memory is configured based on the preset memory access mode, so that the virtual memory is accessed in a mode consistent with the access mode to the system memory.

As one possible implementation, the step of measuring memory access pressure of the hardware management unit includes: detecting memory access latency of the hardware management unit; and determining the memory access pressure according to the memory access latency.

In an embodiment of the present disclosure, the memory access pressure is effectively measured by detecting the memory access latency of the hardware management unit.

As one possible implementation, the step of adjusting the size of the virtual memory according to the memory access pressure includes: reducing the size of the virtual memory if the memory access pressure exceeds the value allowed by the hardware management unit.

In an embodiment of the present disclosure, if the memory access pressure exceeds the value that is allowed by the hardware management unit, the size of the virtual memory is reduced to avoid frequent use of the virtual memory, which will cause memory exhaustion and crashing of the application program.

As one possible implementation, the solid-state storage hard disk is a solid-state drive (SSD) that uses NAND flash rather than magnetic disks as its high-speed, secondary storage medium. The hardware management unit is a queue manager (QM), which is a hardware unit in the FLC system responsible for managing the hardware units in the non-volatile memory express (NVMe) queue. The high-speed access protocol is NVMe.

In an embodiment of the present disclosure, based on the FLC system, (an) SSD is used as the solid-state storage hard disk, QM is used as the hardware management unit, and NVMe is used as the high-speed access protocol, so as to realize non-differential access to the SSD virtual memory and system memory based on QM.

In the second aspect, an embodiment of the present disclosure provides a configuration apparatus for memory, including various functional modules for implementing the configuration method for memory in the first aspect and any possible implementation of the first aspect.

In the third aspect, an embodiment of the present disclosure provides an electronic device, including: a processor and a storage connected to the processor for communication, wherein the storage stores instructions executable by the processor, and the processor executes the instructions to implement the configuration method in the first aspect and any possible implementation of the first aspect.

In the fourth aspect, an embodiment of the present disclosure provides a computer-readable storage medium, wherein a computer program is stored. When a computer runs the program, the configuration method for the memory in the first aspect and any possible implementation of the first aspect is executed.

BRIEF DESCRIPTION OF DRAWINGS

In order to more clearly illustrate the technical solutions of the embodiments of the present disclosure, the drawings that need to be used in the embodiments are briefly introduced below. It is to be understood that the following drawings illustrate only certain embodiments of the present disclosure, and are therefore not to be construed as a limitation to its scope. For those skilled in the art, other related drawings may be obtained from these drawings without any creative efforts.

Component Reference Numerals: 300—configuration apparatus for memory; 310—configuration module; 320—path establishment module; 400—electronic device; 410—processor; 420—storage.

DETAILED DESCRIPTION OF EMBODIMENTS

The technical solutions of the embodiments of the present disclosure are described below with reference to the drawings in the embodiments of the present disclosure.

The technical solutions in accordance with the embodiments of the present disclosure can be applied to the memory configuration of a computer system. The computer system includes the system memory and virtual memory which is obtained by virtualizing a part of the system storage space. The system storage space can be expanded through the virtual memory, and thereby reducing the cost and the system power consumption by memory storage.

The above-mentioned virtual memory technology may be the FLC technology, in which the system memory is used as the ultimate cache of the computer system, and a part of the non-volatile storage space of the system is virtualized as the system memory. As a result, the system storage space is expanded while the cost and the system power consumption caused by the use of volatile (memory) storage are reduced.

To facilitate understanding of the technical solutions of the subsequent embodiments, some related technical terms involved in the FLC technology are introduced below.

In computer systems based on FLC technology, the FLC module replaces the traditional memory unit, and can access the hard disk without the system bus. Therefore, a part of the hard disk space can be allocated to the memory. Then, the central processing unit (CPU) is notified of the range of the expanded memory. For example, suppose one system is mainly composed of 1 GB memory and a 100 GB hard disk. With the FLC technology, 10 GB of the hard disk space can be allocated to the memory, so that a system with 11 GB memory and a 90 GB hard disk is presented to the CPU.

Figure 2:
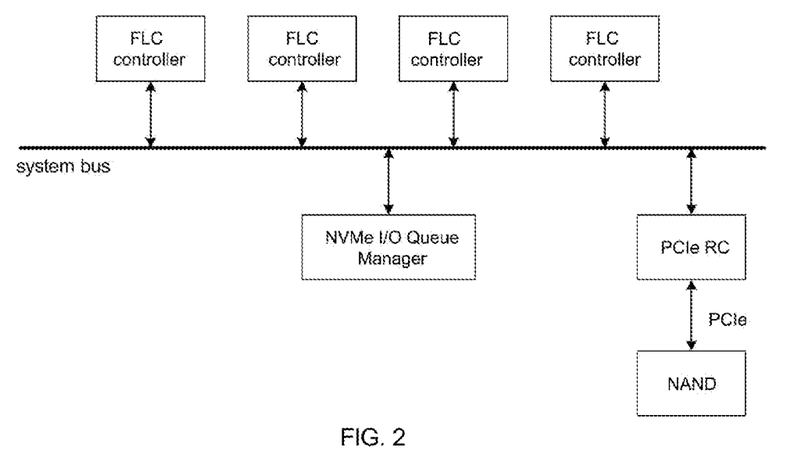
FIG. 2 is a schematic structural diagram of a computer system based on FLC technology in accordance with an embodiment of the present disclosure.

On this basis, the system shown in FIG. 2 can be seen by further zooming in, with FIG. 2 specifically showing an example of the FLC controller and the storage driver (generally referring to the secondary storage medium in the computer system). In FIG. 2, the storage driver is replaced by NVMe SSD (not shown in the figure), and the NVMe I/O queue manager can be seen as a hardware unit that assists the communication between the FLC controller and the SSD. More specifically, the NVMe I/O queue manager generates NVMe commands for data transfer. NVMe can be understood as a protocol for communication with the hard disk similar to the Serial Advanced Technology Attachment (SATA) protocol. PCIe RC stands for the root complexity (RC) of Peripheral Component Interconnect Express (PCIe, a high-speed serial computer expansion bus standard), which can be understood as the PCIe controller of the computer.

Therefore, in the technical solutions of the embodiments of the present disclosure, the memory configuration is realized based on the QM and the SSD. The QM is the hardware management unit for managing high-speed access protocol queues and the SSD is the solid-state storage hard disk.

With reference to the introduction of the computer system above, the hardware environment of the technical solutions in accordance with an embodiment of the present disclosure may be a computer system. Moreover, the above technical solutions may be implemented by a user-mode program based on a Linux operating system. After the user-mode program is run on the computer system, the automatic configuration for the memory can be realized.

In some embodiments, based on the application scenario of the FLC technology, communication mechanism in addition to ioctl (input/output control, which is a system call dedicated to the input and output operations of a device) may be used between the driver and the user-mode program. For example, communication mechanisms of Linux kernel mode and user mode such as shared memory can be used. Moreover, the above-mentioned hard disk may be an NVMe SSD. Embedded Multi-Media Cards (eMMCs) or other hard disk protocols such as SATA or Small Computer System Interface (SCSI) are also supported with slight packaging of the interface.

Figure 3:
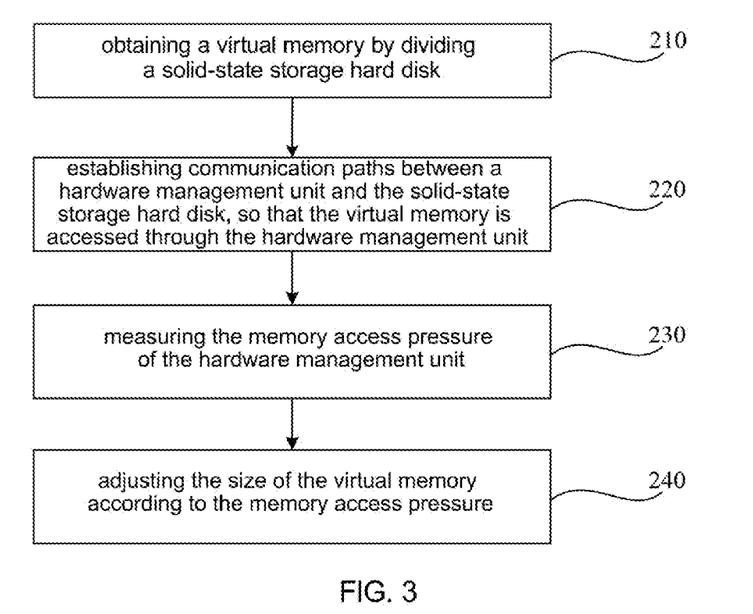
FIG. 3 is a flowchart of the memory configuration method in accordance with an embodiment of the present disclosure.

Referring to FIG. 3, a flowchart of the memory configuration method in accordance with an embodiment of the present disclosure is shown based on the preceding introduction of the application scenarios. The configuration method includes:

Step 210: obtaining virtual memory by dividing a solid-state storage hard disk.

Optionally, Step 210 includes: dividing the solid-state storage hard disk to obtain a storage space that upper-layer applications are not allowed to access, and determining the storage space as virtual memory.

In this implementation, in order to prevent users from accessing the part of the solid-state storage hard disk space that has been allocated as virtual memory, the driver of the high-speed access protocol divides the solid-state storage hard disk to obtain a space that upper-layer applications are not allowed to access. That is, users can be prevented from destroying the data originally stored in the solid-state storage hard disk.

The upper-layer applications may be various application programs running in the computer system.

In an embodiment of the present disclosure, the storage space that upper-layer applications are not allowed to access is obtained by dividing the solid-state storage hard disk, and the storage space is used as virtual memory, so that virtual memory is determined.

Step 220: establishing communication paths between a hardware management unit and the solid-state storage hard disk, so that the virtual memory is accessed through the hardware management unit.

The hardware management unit is used to manage high-speed access protocol queues, and further, users essentially implement the access to the virtual memory through the hardware management unit.

Optionally, Step 220 includes: sending the queue address of the hardware management unit to the driver of the solid-state storage hard disk, and controlling the driver to use the queue address of the hardware management unit to create a new I/O queue, so that a path from the solid-state storage hard disk to the hardware management unit is established; obtaining attribute information of the solid-state storage hard disk, and configuring the hardware management unit based on the attribute information, so that I/O commands for the solid-state storage hard disk are generated in the queue of the hardware management unit, and a path from the hardware management unit to the solid-state storage hard disk is established.

In this implementation, the path from the solid-state storage hard disk to the hardware management unit is established first, and then the path from the hardware management unit to the solid-state storage hard disk is established.

For the path from the solid-state storage hard disk to the hardware management unit, the queue address of the hardware management unit is sent to the driver of the solid-state storage hard disk, and the driver is notified to create a new I/O queue based on the queue address of the hardware management unit. After the new I/O queue is created, the path from the solid-state storage hard drive to the hardware management unit is established.

The control of the driver mainly instructs the driver on how to create a new I/O queue, the details of which can be found in descriptions of mature technologies in the field and are not provided herein.

In some embodiments, the I/O queue of the solid-state storage hard disk is understood as a queue established between the driver and the solid-state storage hard disk. There is a maximum value for the number of I/O queues, that is, the maximum number of I/O queues which can be allowed by the solid-state storage hard disk.

Therefore, in order to ensure successful I/O queue creation, the configuration method further includes the following steps prior to the creation of a new I/O queue: determining whether the number of I/O queues of the solid-state storage hard disk reaches the maximum value. If it reaches the maximum number of I/O queues, the driver is controlled to delete a pair of I/O queues from the I/O queues of the solid-state storage hard disk.

In this embodiment, the number of I/O queues of the solid-state storage hard disk is measured. If the maximum number of I/O queues is reached, it is required that only after the driver is controlled to delete one pair of I/O queues can a new I/O queue be created. If the maximum number of I/O queues is not reached, a new I/O queue can be directly created without any changes to the pre-existing I/O queues.

In an embodiment of the present disclosure, if the number of the I/O queues of the solid-state storage hard disk reaches the maximum value, a pair of I/O queues is deleted before creating a new 10 queue, so as to ensure that the communication path between the solid-state storage hard disk and the hardware management unit can be successfully established.

For the path from the hardware management unit to the solid-state storage hard disk, the attribute information of the solid-state storage hard disk is first obtained, and then the hardware management unit is configured based on the attribute information. After the configuration is completed, I/O commands corresponding to the solid-state storage hard disk can be generated in the queue of the hardware management unit, so that the path from the hardware management unit to the solid-state storage hard disk can be established.

In some embodiments, the attribute information of the solid-state storage hard disk includes parameters such as storage format and space name, which is not limited herein.

In an embodiment of the present disclosure, the establishment of the communication paths between the hardware management unit and the solid-state storage hard disk is realized by respectively establishing a path from the solid-state storage hard disk to the hardware management unit, and from the hardware management unit to the solid-state storage hard disk.

In other embodiments, the paths between the solid-state storage hard disk and the hardware management unit may also be established through other implementation, which is not limited herein.

After Step 220 is executed, the application programs of the computer system can access the virtual memory.

In some embodiments, in order that users can access virtual memory in a consistent way as they access system memory, the configuration method further includes: configuring the access mode to the virtual memory according to the preset memory access mode.

The preset memory access mode can be a general memory access mode. For example, the general access size of NVMe logical block address (LBA) is 4 kilobytes (KB), and the general access size of the hard disk is 512 bytes (B). In this case, the access size of the virtual memory can be modified from 512 B to 4 KB to suit the size of commonly used pages in memory access.

In an embodiment of the present disclosure, the access mode of the virtual memory is set based on the preset memory access mode, so that the access mode of the virtual memory is consistent with that of the system memory.

Step 230: measuring the memory access pressure of the hardware management unit.

It is to be understood that setting too much space for virtual memory will give upper-layer applications a false impression that the system has plenty of memory. As a result, upper-layer applications may generate an excessive amount of memory usage pressure for the system. If the processing capacity of the system is exceeded, the system performance will deteriorate. Some functions will even become completely stuck and unavailable.

Therefore, in Step 230, the memory access pressure may be measured, so as to adjust the size of the virtual memory based on the memory access pressure.

Optionally, Step 230 includes: detecting the memory access latency of the hardware management unit; and determining the memory access pressure according to the memory access latency.

The memory access latency can be obtained by periodically accessing the system controller. In some embodiments, the memory access latency may be the average latency of memory accesses by the hardware management unit.

Further, the relationships between the memory access latency and the memory access pressure level can be preset. The greater the memory access latency, the greater the corresponding memory access pressure, and further, the greater the memory access pressure level.

In an embodiment of the present disclosure, the effective determination of the memory access pressure is realized by detecting the memory access latency of the hardware management unit.

Step 240: adjusting the size of the virtual memory according to the memory access pressure.

It is to be understood that the increase in memory access pressure may cause system operation exceptions. If the memory access pressure is normal, the system will run stably.

Therefore, Step 240 optionally includes: reducing the size of the virtual memory if the memory access pressure exceeds the value allowed by the hardware management unit.

The memory access pressure allowed by the hardware management unit may be a preset memory access pressure level. When the aforementioned memory access pressure level exceeds the preset level, the memory access pressure is too high, and the size of the virtual memory will be reduced.

When reducing the size of the virtual memory, the space of the solid-state storage hard disk may be re-divided according to the aforementioned method for virtual memory determination.

Taking the FLC system as an example, the adjustment process of virtual memory may include: firstly, informing the system through memory hot plug mechanism of Linux that part of the memory will soon become invalid; and secondly, releasing, through the NVMe driver (that is, the driver), the space originally allocated to virtual memory, so that it can be accessed normally by users as hard disk space.

In an embodiment of the present disclosure, if the memory access pressure exceeds the maximum value allowed by the hardware management unit, the size of the virtual memory is reduced to avoid frequent use of the virtual memory, which can cause memory exhaustion and crashing of the application program.

It is to be understood that the above-mentioned dynamic memory adjustment process is repeated periodically. That is, the memory access pressure can be measured every other cycle, and the virtual memory is adjusted according to the measurement result.

Referring to the introduction of the aforementioned application scenarios, in some embodiments, the solid-state storage hard disk is SSD, the hardware management unit is QM, and the high-speed access protocol is NVMe.

In other embodiments, the high-speed access protocol may also be eMMC, SATA, or SCSI, which is not limited herein.

In an embodiment of the present disclosure, based on the FLC system, the SSD is used as the solid-state storage hard disk, QM is used as the hardware management unit, and NVMe is used as the high-speed access protocol, so as to realize non-differential access to the SSD virtual memory and system memory based on QM.

When the technical solutions in accordance with the embodiments of the present disclosure are loaded in the computer system in the form of software or an application program, the memory is configured and dynamically adjusted, so that users can enjoy non-differential access of the real memory (that is, the system memory) and virtual memory with the help of FLC.

Specifically, a specific implementation of the above-mentioned configuration method for memory may be as follows. First, a storage space that upper-layer applications are not allowed to access is obtained by dividing a solid-state storage hard disk, and the storage space is determined as virtual memory. Then, the queue address of the hardware management unit is sent to the driver of the solid-state storage hard disk, and the driver is controlled to use the queue address of the hardware management unit to create a new I/O queue, so that a path from the solid-state storage hard disk to the hardware management unit is established. In addition, the attribute information of the solid-state storage hard disk is acquired, and the hardware management unit is configured based on the attribute information, so that I/O commands corresponding to the solid-state storage hard disc can be generated in the queue of the hardware management unit, and a path from the hardware management unit to the solid-state storage hard disk is established. Then, the memory access latency of the hardware management unit is detected; and the memory access pressure is determined according to the memory access latency. If the memory access pressure exceeds the value allowed by the hardware management unit, the size of the virtual memory is reduced.

The memory configuration method exemplified here is only one of many embodiments of the memory configuration method for the present disclosure, and therefore, the memory configuration method exemplified herein should not be construed as a limitation to its scope.

Figure 4:
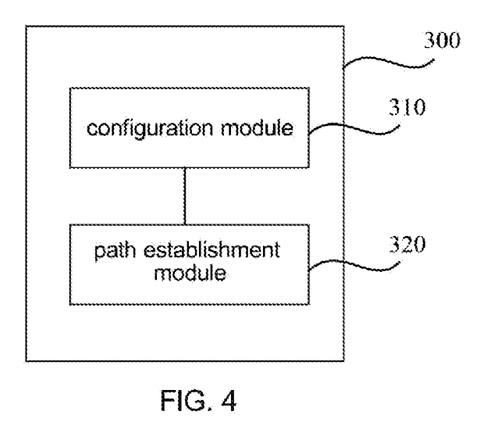
FIG. 4 is a schematic structural diagram of the configuration apparatus for memory in accordance with an embodiment of the present disclosure.

Based on the same invention concept, as shown in FIG. 4, an embodiment of the present disclosure further provides a configuration apparatus for memory 300, including: a configuration module 310 and a path establishment module 320.

The configuration module 310 is used for obtaining the virtual memory by dividing the solid-state storage hard disk. The path establishment module 320 is used for establishing the communication path between the hardware management unit and the solid-state storage hard disk, so that users can access the virtual memory through the hardware management unit. The hardware management unit is used to manage high-speed access protocol queues. The configuration module 310 can also measure the memory access pressure of the hardware management unit. The size of the virtual memory is adjusted according to the memory access pressure.

In an embodiment of the present disclosure, the configuration module 310 is specifically used for dividing the solid-state storage hard disk to obtain a storage space that cannot be accessed by upper-layer applications. This storage space is determined as the virtual memory.

In an embodiment of the present disclosure, the path establishment module 320 is specifically used for sending the address of the hardware management unit to the driver of the solid-state storage hard disk, and controlling the driver to use the queue address of the hardware management unit to create a new I/O queue, so that a path from the solid-state storage hard disk to the hardware management unit is established. This module also acquires attribute information of the solid-state storage hard disk, and configures the hardware management unit based on the attribute information, so that I/O commands for the solid-state storage hard disk are generated in the queue of the hardware management unit, and a path from the hardware management unit to the solid-state storage hard disk is established.

In an embodiment of the present disclosure, the path establishment module 320 is further used for determining whether the number of the I/O queues of the solid-state storage hard disk reaches the maximum value, wherein if the number of the I/O queues of the solid-state storage hard disk reaches the maximum value, the driver is controlled to delete a pair of I/O queues from the I/O queues of the solid-state storage hard disk.

In an embodiment of the present disclosure, the configuration module 310 is further used for configuring the access mode of the virtual memory according to the preset memory access mode.

In an embodiment of the present disclosure, the configuration module 310 is further used for detecting the memory access latency of the hardware management unit, and determining the memory access pressure according to the memory access latency.

In an embodiment of the present disclosure, the configuration module 310 is further used for reducing the size of the virtual memory if the memory access pressure exceeds the value allowed by the hardware management unit.

In an embodiment of the present disclosure, the solid-state storage hard disk is an SSD, the hardware management unit is a QM, and the high-speed access protocol is NVMe.

The operation of the configuration apparatus for memory 300 and the operation of functional modules are performed with reference to the corresponding processes in the foregoing embodiment of the method, and therefore will not be repeated here.

Figure 5:
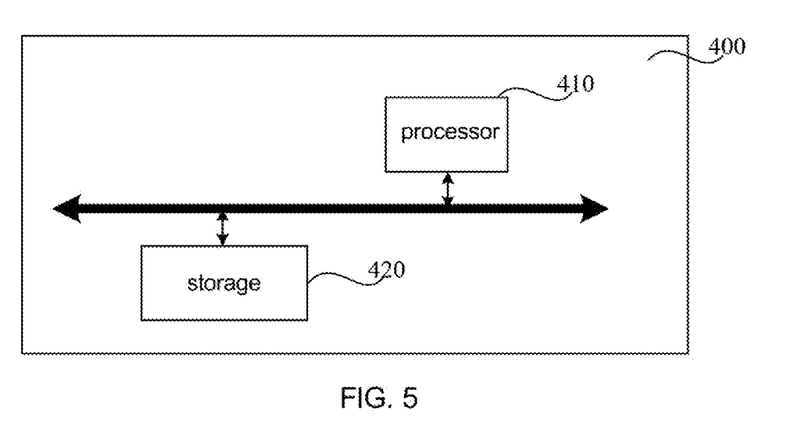
FIG. 5 is a schematic structural diagram of the electronic device in accordance with an embodiment of the present disclosure.

Referring to FIG. 5, an embodiment of the present disclosure further provides an electronic device 400, which can be used as the execution entity of the aforementioned configuration method for memory. The electronic device 400 includes a processor 410 and a storage 420 that is connected to the processor 410 for communication.

The storage 420 stores instructions that can be executed by the processor 410. The processor 410 executes the instructions to execute the configuration method for memory in the foregoing embodiments.

The processor 410 and the storage 420 may be connected by a communication bus. Alternatively, they may be connected through some communication modules, such as a wireless communication module (e.g., 4G or 5G), or a Bluetooth communication module.

The processor 410 may be an integrated circuit chip with signal processing capability. The processor 410 may be a general-purpose processor, such as a CPU or network processor (NP). The processor 410 may also be a digital signal processor, an Application-Specific Integrated Circuit, a Field Programmable Gate Array or other programmable logic device, a discrete gate or a transistor logic device, or a discrete hardware component. The processor 410 can implement or execute the methods, steps, and logical block diagrams disclosed in the embodiments of the present disclosure. A general-purpose processor may be a microprocessor or any conventional processor.

The storage 420 may be, but is not limited to, a random access memory (RAM), a read-only memory (ROM), a programmable read-only memory (PROM), an erasable programmable ready-only memory (EPROM), or an electric erasable programmable read-only memory (EEPROM).

It is to be understood that the electronic device 400 may further include additional required general modules. These general modules will not be introduced one by one in embodiments of the present disclosure.

An embodiment of the present disclosure also provides a computer-readable storage medium, wherein a computer program is stored. When the computer program is run by a computer, the memory configuration method described in the foregoing embodiments is executed.

In the embodiments provided in the present disclosure, it is to be understood that the disclosed device and method may be implemented in other manners. The embodiments of the device described above are only illustrative. For example, the division of the unit is only a logical function division. In actual implementation, there may be other division methods. Another example is that multiple units or components may be combined or integrated into another system, and some features can be ignored or not implemented. In addition, the shown or discussed mutual coupling, direct coupling, or communication connection may be implemented through communication interfaces. Indirect coupling or communication connection of devices or units may be in electrical, mechanical, or other forms.

In addition, the units described as separate components may be or not be separated physically. The components illustrated as units may be or not be physical units. In other words, they may be located at one place or they may be distributed onto multiple network units. Some or all of the units may be selected as actually required to achieve the objectives of the solutions of the present embodiments.

Besides, the individual functional modules in the embodiments of the present disclosure may be integrated together to form an independent part, or each of the modules may be physically stand-alone, or two or more of the modules may be integrated into an independent part.

Relationship terms such as first, second, and the like are used herein only for distinguishing one entity or operation from another entity or operation, while it is not necessarily required or implied that these entities or operations have any such practical relationship or order.

The above description is merely illustrative of the embodiments of the present disclosure and is not intended to limit the scope of protection of the present disclosure. It will be understood by those skilled in the art that various modifications and variations may be made to the present disclosure. Any modifications, equivalent alternatives, improvements and so on made within the spirit and principle of the present disclosure are intended to be encompassed within the scope of protection of the present disclosure.

What is claimed is:

1. A memory configuration method, comprising steps of:
    obtaining virtual memory by dividing a solid-state storage hard disk;
    establishing communication paths between a hardware management unit and the solid-state storage hard disk, so that the virtual memory can be accessed through the hardware management unit; wherein the hardware management unit is configured to manage access protocol queues;
    measuring memory access pressure of the hardware management unit; and
    adjusting a size of the virtual memory according to the memory access pressure;
    wherein the step of establishing communication paths between the hardware management unit and the solid-state storage hard disk comprises:
    sending a queue address of the hardware management unit to a driver of the solid-state storage hard disk, and controlling the driver to create an I/O queue using the queue address, so as to establish a path from the solid-state storage hard disk to the hardware management unit; and
    obtaining attribute information of the solid-state storage hard disk, and configuring the hardware management unit based on the attribute information, so as to generate I/O commands corresponding to the solid-state storage hard disk in the queue of the hardware management unit, and establish a path from the hardware management unit to the solid-state storage hard disk.

2. The memory configuration method according to claim 1, wherein the step of obtaining virtual memory by dividing a solid-state storage hard disk comprises:
    dividing the solid-state storage hard disk to obtain a storage space that upper-layer applications are not allowed to access, wherein the storage space is determined as the virtual memory.

3. The memory configuration method according to claim 1, wherein the configuration method for memory further comprises steps of:
    determining whether a number of I/O queues of the solid-state storage hard disk reaches a maximum; and
    controlling the driver to delete a pair of I/O queues from the I/O queues of the solid-state storage hard disk, if the number of the I/O queues of the solid-state storage hard disk reaches the maximum.

4. The memory configuration method according to claim 1, wherein the configuration method for memory further comprises a step of:
    configuring an access mode of the virtual memory according to a preset memory access mode.

5. The memory configuration method according to claim 1, wherein the step of measuring the memory access pressure of the hardware management unit comprises:
    detecting memory access latency of the hardware management unit; and
    determining the memory access pressure according to the memory access latency.

6. The memory configuration method according to claim 1, wherein the step of adjusting the size of the virtual memory according to the memory access pressure comprises:
    reducing the size of a virtual memory, if the memory access pressure exceeds a value allowed by the hardware management unit.

7. An electronic device, comprising:
    a processor; and a storage connected to the processor for communication,
    wherein instructions executable by the processor are stored in the storage, the instructions are executed by the processor, and the processor executes the instructions to execute the configuration method for memory according to claim 1.

8. The electronic device according to claim 7, wherein the step of obtaining virtual memory by dividing a solid-state storage hard disk comprises:
    dividing the solid-state storage hard disk to obtain a storage space that upper-layer applications are not allowed to access, wherein the storage space is determined as the virtual memory.

9. The electronic device according to claim 7, wherein the configuration method for memory further comprises steps of:
    determining whether a number of I/O queues of the solid-state storage hard disk reaches a maximum; and
    controlling the driver to delete a pair of I/O queues from the I/O queues of the solid-state storage hard disk if the number of the I/O queues of the solid-state storage hard disk reaches the maximum.

10. The electronic device according to claim 7, wherein the configuration method for memory further comprises a step of:
    configuring an access mode of the virtual memory according to a preset memory access mode.

11. The electronic device according to claim 7, wherein the step of measuring memory access pressure of the hardware management unit comprises:
    detecting memory access latency of the hardware management unit; and
    determining the memory access pressure according to the memory access latency.

12. The electronic device according to claim 7, wherein the step of adjusting the size of the virtual memory according to the memory access pressure comprises:
    reducing the size of the virtual memory, if the memory access pressure exceeds a value allowed by the hardware management unit.

* * * * *